(12) United States Patent
Thapliyal et al.

(10) Patent No.: US 11,206,146 B2
(45) Date of Patent: Dec. 21, 2021

(54) ARCHITECTURE FOR GENERATING PHYSICALLY UNCLONABLE FUNCTION RESPONSE

(71) Applicant: University of Kentucky Research Foundation, Lexington, KY (US)

(72) Inventors: Himanshu Thapliyal, Lexington, KY (US); Carson Labrado, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 16/983,329

(22) Filed: Aug. 3, 2020

(65) Prior Publication Data
US 2021/0036874 A1    Feb. 4, 2021

Related U.S. Application Data

(60) Provisional application No. 62/881,454, filed on Aug. 1, 2019.

(51) Int. Cl.
*G06F 11/30* (2006.01)
*H04L 9/32* (2006.01)
*G16Y 30/10* (2020.01)
*G06F 12/14* (2006.01)
*H02N 2/18* (2006.01)

(52) U.S. Cl.
CPC ............ *H04L 9/3278* (2013.01); *G16Y 30/10* (2020.01); *H02N 2/181* (2013.01)

(58) Field of Classification Search
CPC .... G16Y 30/10; H02N 2/181; H04L 2209/12; H04L 9/3278
See application file for complete search history.

(56) References Cited

U.S. PATENT DOCUMENTS

| | | | | |
|---|---|---|---|---|
| 3,133,190 A | * | 5/1964 | Eckert, Jr. ............... | G06F 15/78 708/604 |
| 3,540,034 A | * | 11/1970 | Kawashima .......... | H03M 1/445 341/162 |
| 3,967,702 A | * | 7/1976 | Iwaska .................. | B66B 1/2458 187/387 |
| 5,243,659 A | * | 9/1993 | Stafford ................. | A42B 3/303 381/110 |
| 8,683,210 B2 | | 3/2014 | Devadas | |

(Continued)

*Primary Examiner* — Gary S Gracia
(74) *Attorney, Agent, or Firm* — Stites & Harbison PLLC; Patrick Torre

(57) ABSTRACT

An equivalent circuit architecture and attendant methods for generating a physically unclonable function (PUF) response include a plurality of devices capable of generating a voltage output, a voltage source, and a microcontroller adapted to receive the voltage output from each device of the plurality of devices. The devices may be energy harvesting devices or sensors. The microcontroller is configured to determine an average peak voltage for predefined groups of the plurality of devices, to compare summation voltage values for the predefined groups, and from that information to output response values defining a 128-bit PUF response. The microcontroller determines a peak voltage of each device of the plurality of devices an equal number of times to generate the 128 bit PUF response value, this preventing biasing the response towards any individual device or group of devices.

26 Claims, 6 Drawing Sheets

(56) References Cited

U.S. PATENT DOCUMENTS

| | | | |
|---|---|---|---|
| 8,995,658 B2 | 3/2015 | Heffner | |
| 9,444,632 B2 | 9/2016 | Pinkse et al. | |
| 9,832,019 B2 | 11/2017 | Choi | |
| 10,009,325 B1 | 6/2018 | David et al. | |
| 10,015,148 B2 | 7/2018 | Heffner | |
| 10,103,895 B1* | 10/2018 | Tseng | G11C 13/004 |
| 10,164,640 B1* | 12/2018 | Lu | H03K 19/17768 |
| 10,325,120 B2* | 6/2019 | Suwald | G06K 9/46 |
| 10,811,073 B2* | 10/2020 | Giterman | G11C 11/402 |
| 2012/0106235 A1 | 5/2012 | Christensen et al. | |
| 2012/0183135 A1 | 7/2012 | Paral et al. | |
| 2017/0134176 A1 | 5/2017 | Kim et al. | |
| 2017/0206383 A1* | 7/2017 | Suwald | G06K 9/46 |
| 2018/0006830 A1 | 1/2018 | Cambou | |
| 2018/0212609 A1 | 7/2018 | Usuda et al. | |
| 2018/0212786 A1 | 7/2018 | Kamiyama et al. | |
| 2018/0234258 A1 | 8/2018 | Peffers et al. | |
| 2018/0287806 A1 | 10/2018 | Carboni et al. | |
| 2019/0156066 A1* | 5/2019 | Foster | G06F 21/72 |
| 2019/0165938 A1* | 5/2019 | Lu | H01L 21/681 |
| 2019/0333567 A1* | 10/2019 | Giterman | G11C 11/402 |
| 2019/0363714 A1* | 11/2019 | O'Dwyer | H03K 19/00369 |
| 2019/0392179 A1* | 12/2019 | Lu | G11C 7/20 |
| 2020/0213139 A1* | 7/2020 | Zou | G01R 31/31709 |
| 2021/0036874 A1* | 2/2021 | Thapliyal | G16Y 30/10 |
| 2021/0135886 A1* | 5/2021 | Lee | G06F 21/75 |
| 2021/0143994 A1* | 5/2021 | Fay | H04L 9/3278 |

\* cited by examiner

ARCHITECTURE FOR GENERATING PHYSICALLY UNCLONABLE FUNCTION RESPONSE

RELATED APPLICATION

This application claims priority to U.S. Provisional Patent Application Ser. No. 62/881,454, filed on Aug. 1, 2019, the full disclosure of which is incorporated herein by reference.

GOVERNMENT SUPPORT

This invention was made with government support under Grant No. 1738662 awarded by the National Science Foundation (NSF). The government may have certain rights in the invention.

TECHNICAL FIELD

This disclosure relates to Physically Unclonable Functions (PUFs). In particular, the disclosure relates to circuit architectures and methods for generating PUF responses utilizing PUFs based on energy harvesting devices and/or sensors.

BACKGROUND

The Internet of Things (IoT) is a network of smart devices that are connected via the internet. A smart device may be described as an internet-enabled embedded system. The IoT does not only comprise simple devices such as sensors and actuators, but instead comprises a wide selection of systems of varying complexity including home appliances, mobile devices, vehicles, and others. Through the IoT, multiple connected devices exchange information as components of intelligent applications.

Unfortunately, the rise of the IoT has been accompanied by a rise in cybercrime as information exchanged between IoT devices can be targeted in cyberattacks. It is estimated that losses due to cybercrime in 2017 approached $600 billion, nearly 1% of the worlds GDP at that time. For this reason, introduction of cybersecurity measures into IoT devices and systems has been an emphasis. One such measure drawing interest is PUFs which are devices using inherent variations caused by manufacturing processes to create unique and unclonable identifiers that can be used as encryption keys.

As is known, PUFs can be thought of as a type of hash function in which a given input (challenge) results in a given output (response). Collectively a challenge and associated response are termed a challenge-response pair (CRP). The functions are termed "physically unclonable" because PUFs are designed such that it is virtually impossible to create multiple PUFs having identical outputs for all possible inputs since PUFs use minor variations inherent to device manufacture to generate their uniqueness property. As an example, in a circuit-based PUF the inherent variations can include qualities such as signal propagation delay times present in wires and logic gates. For this reason, each PUF of a set of ideal identically-designed PUFs will have a unique response to a same challenge, thus producing different CRPs from identical PUFs with identical challenges. A strong PUF will have a large number of viable CRPs, whereas a weak PUF will have a limited number of possible CRPs.

These properties of uniqueness and unclonability make PUFs attractive for use in security applications. An attacker would be required to obtain the actual PUF itself to use in an attack, since it would be impossible to create an exact copy of the desired PUF. A common use of PUFs in security applications is their use in the generation and storage of secret keys. While a PUF response itself cannot be used as a secret key due to inherent reliability issues and mathematical constraints placed on secret keys by their respective cryptosystems, PUF responses can be used as a seed in the process of creating one or more secret keys. A further advantage of using PUF responses to create secret keys is that they never require secure memory—the PUF generates the secret key each time it is needed. In contrast, conventional cryptographic systems require storage of a created secret key in secure memory to prevent unauthorized access. Disadvantageously, secure memory is more expensive and slower to access than non-secure memory. A weak PUF response is a seed from which all subsequent master keys are derived, which can be disadvantageous since an attacker need only compromise a single CRP or potentially a single secret key to compromise all keys generated from the seed. A strong PUF instead provides more security as each key is derived from a different CRP. The CRPs of strong PUFs are unpredictable and therefore even if an attacker compromises some of the CRPs or keys it has generated, the rest are virtually unaffected.

Known PUFs include silicon-based PUFs and non-silicon-based PUFs. Silicon-based PUFs rely on transistor level variations that occur during manufacturing. These variations manifest as non-uniform delays between gates in each instance of the PUF. The number of variations is sufficiently large to allow unique identification of individual chips despite identical designs and manufacture by identical manufacturing processes. Examples of silicon-based PUFs include arbiter PUFs, SRAM PUFs, ring oscillator PUFs, butterfly PUFs, latch PUFs, and flip-flop PUFs. Non-silicon-based PUFs are based on larger components such as sensors rather than on transistor-level designs. These may be based on a wide range of devices including microelectromechanical systems-based sensors, device touchscreens, photodiodes, and solar cells. Sensor-based PUFs have some advantages over silicon-based PUFs in that, due to the design process, they can be readily tested and modified since they are made from existing components. On the other hand, the need to actually manufacture silicon-based PUF designs makes the creation of physical copies prohibitive in some cases. For that reason, silicon-based PUF designs tend to be simulated and tested using software rather than testing the actual physical device. A disadvantage of non-silicon PUFs is their relatively larger size of componentry, which makes the devices larger in size than silicon-based PUFs.

Accordingly, there is identified a need in the art for PUF designs specifically targeted to IoT applications, which provide the advantages of the smaller size of silicon-based PUFs but which admit of convenient testing of physical copies.

SUMMARY

In the following description, there are shown and described several embodiments of a PUF architecture and attendant methods for generating a PUF response. In one aspect of the disclosure an equivalent circuit architecture for generating a physically unclonable function (PUF) response is described. The architecture includes a plurality of devices capable of generating an output that is or can be converted to a voltage output, a voltage source adapted to apply a voltage to each device of the plurality of devices, and a microcontroller adapted to receive the voltage output from each device of the plurality of devices. The microcontroller is configured to at least determine an average peak voltage for a first predefined group of the plurality of devices to provide a first summation value and determine an average peak voltage for a different predefined group of the plurality of devices to provide a different summation value. The microcontroller further compares the first summation value to the different summation value and output a first response value that is defined as 1 if the first summation value is greater than the different summation value or is defined as 0 of the first summation value is less than the different summation value, whereby the first response value defines a first PUF response bit.

The microcontroller is further configured to determine an average peak voltage for a next predefined group of the plurality of devices that is different from the first predefined group and the different predefined group to provide a next summation value and to determine an average peak voltage for a next different predefined group of the plurality of devices that is different from the first predefined group, the different predefined group, and the next predefined group to provide a next different summation value. Then, the microcontroller is configured to compare the next summation value to the next different summation value and output a next response value that is defined as 1 if the next summation value is greater than the next different summation value or is defined as 0 if the next summation value is less than the next different summation value, whereby the next response value defines a next PUF response bit. The microcontroller iteratively repeats the steps of determining, comparing, and outputting until a 128-bit PUF response value is defined. The microcontroller is further configured to determine a peak voltage of each device of the plurality of devices an equal number of times to generate the 128-bit PUF response value to prevent biasing the generated response in favor of a particular device or group of devices.

In embodiments, the voltage source may be an alternating current (AC) source or a direct current (DC) source.

The plurality of devices may include any device that outputs a variable voltage, current, or resistance from which can be derived a voltage value associated with each device that can be measured. In embodiments, the plurality of devices may be energy harvesting devices. In one particular embodiment, the energy harvesting devices may be piezo sensors. In another particular embodiment, the energy harvesting devices may be thermistors. The architecture may further include a plurality of resistors that is equivalent in number to the plurality of devices. In one particular embodiment, the plurality of devices may consist of eight devices.

In another aspect of the disclosure, a computer-implemented method for generating a unique PUF response to a challenge is described. The method utilizes the above-described architecture and microcontroller configuration to generate the unique PUF response. As described the PUF architecture includes a plurality of devices each capable of generating an output that is or can be converted to a voltage output, a voltage source, and a microcontroller adapted to receive the voltage output from each device of the plurality of devices. The microcontroller is provided with computer-executable instructions to at least determine an average peak voltage for a first predefined group of the plurality of devices to provide a first summation value, determine an average peak voltage for a different predefined group of the plurality of devices to provide a different summation value, and compare the first summation value to the different summation value and output a first response value that is defined as 1 if the first summation value is greater than the different summation value or is defined as 0 of the first summation value is less than the different summation value, whereby the first response value defines a first PUF response bit.

The microcontroller is further configured to determine an average peak voltage for a next predefined group of the plurality of devices that is different from the first predefined group and the different predefined group to provide a next summation value, determine an average peak voltage for a next different predefined group of the plurality of devices that is different from the first predefined group, the different predefined group, and the next predefined group to provide a next different summation value, and to compare the next summation value to the next different summation value and output a next response value that is defined as 1 if the next summation value is greater than the next different summation value or is defined as 0 if the next summation value is less than the next different summation value, whereby the next response value defines a next PUF response bit. This process is iteratively repeated to define a 128-bit PUF response value. The microcontroller determines a peak voltage of each device of the plurality of devices an equal number of times to prevent bias in generating the 128-bit PUF response value.

In embodiments, the first predefined group, the different predefined group, the next predefined group, and the next different predefined group each consist of three devices. Other aspects of the described PUF architecture are as described above.

As it should be realized, the architecture, device, and methods are capable of other, different embodiments and their several details are capable of modification in various, obvious aspects all without departing from the presently described PUF architecture as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification illustrate several aspects of the PUF architecture and attendant methods and together with the description serve to explain certain principles thereof. In the drawings.

Reference will now be made in detail to the present preferred embodiments of the disclosed PUF architecture, device, and attendant methods, examples of which are illustrated in the accompanying drawing figures.

DETAILED DESCRIPTION

At a high level, the present disclosure describes a PUF architecture based on use of measurement of changes in voltage output/resistance values, and attendant methods and devices employing that architecture to create a PUF providing a unique CRP. The disclosure describes a PUF architecture incorporating devices capable of generating an output that is or can be converted to a voltage output value or a resistance value. Particular embodiments describe a PUF architecture incorporating particular energy harvesters and particular sensors. However, it will be readily appreciated by the skilled artisan that the described architecture, devices, and methods are adaptable to inclusion of alternative devices as long as they are capable of generating a voltage output value or a resistance value. Accordingly, the description should not be taken as limiting in that regard.

Energy Harvester-Based PUF

In embodiments of one aspect of the disclosure, an energy harvester-based PUF architecture is described. The disclosed energy harvester-based PUF architecture comprises a microcontroller, a plurality of energy harvesters, a plurality of resistors, and a voltage source. The PUF is considered a "weak" PUF as it is designed for only one CRP. This is because the response generated by the disclosed PUF is a result of comparing intrinsic characteristics of the energy harvesters. Those intrinsic characteristics do not change, and therefore comparisons of the characteristics and the responses derived therefrom equally do not change. In embodiments, the PUF architecture comprises piezo sensors. However, it will be readily apparent to the skilled artisan that the described architecture readily lends itself to alternative energy harvesters, for example solar/photovoltaic cells, thermoelectric generators, kinetic energy harvesters, and others which exhibit unique differences in voltage output.

Figure 1:
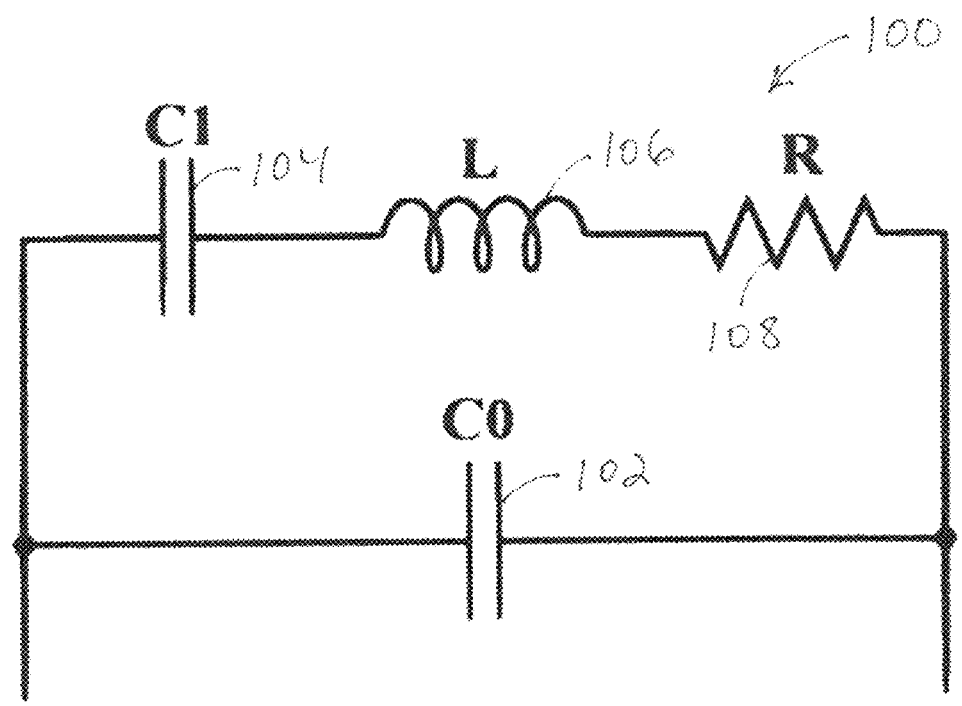
FIG. 1 illustrates a representative energy harvester circuit according to the present disclosure.

In one possible embodiment, the PUF architecture comprises a microcontroller, eight piezo sensors, eight 100 KΩ resistors, and an AC voltage source. As is known, piezo sensors use the piezoelectric effect to convert kinetic energy contained in vibrations and other motions into electricity. A representative piezo sensor can be modeled by the Butterworth-van-Dyke equivalent circuit 100 illustrated in FIG. 1. In that figure, capacitor 102 ($C_0$) represents the electrical capacitance between the piezo sensor leads. Capacitor 104 ($C_1$) represents the mechanically equivalent capacitance inversely proportional to the stillness of the piezo sensor. Inductor 106 (L) represents the mechanically equivalent inductance proportional to the mass of the piezo sensor. Resistor 108 (R) represents the losses across the piezo sensor.

The presence of capacitors and inductors in the equivalent circuit provides for variation of the equivalent impedance of the piezo sensor by connecting an AC voltage source (not shown in this figure) to the leads of the sensor and varying its frequency. In theory, multiple copies of a same model piezo sensor would have identical parameters for each component in their respective equivalent circuit. In actuality, the manufacturing process introduces slight variations into each individual sensor, providing unique characteristics for each sensor that manifest as the component values in the equivalent circuit. These unique characteristics are used to create a PUF.

Figure 2:
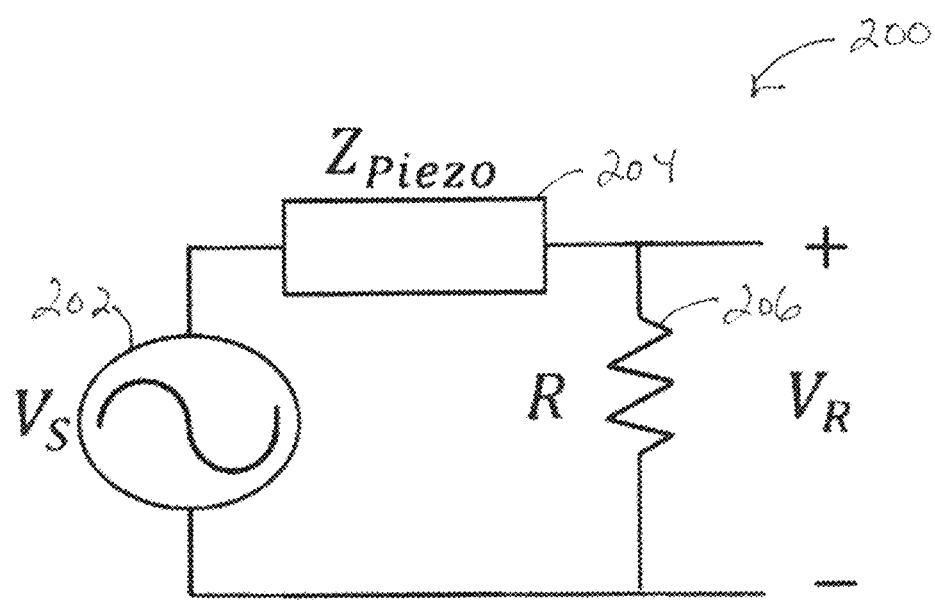
FIG. 2 illustrates an energy harvester-based PUF equivalent circuit according to the present disclosure.

Reference is now made to FIG. 2 illustrating a representative circuit 200 forming the basic building block of a PUF according to the present disclosure. The circuit 200 includes an AC voltage source 202 ($V_s$), a piezo sensor 204, and a 100 KΩ resistor 206 (R) placed in series. Assuming peak amplitude of the input voltage source 202 remains constant, then the voltage $V_R$ across resistor 206 will be determined by the impedance $Z_{piezo}$ of the piezo sensor 204 which in turn will be determined by the frequency of the voltage source. Across multiple copies of this circuit 200, even if each circuit has identical input voltage sources, the voltage $V_R$ across resistor 206 will in actuality not be consistent but rather will vary due to unique intrinsic characteristics of each piezo sensor 204. These unique intrinsic characteristics will manifest as unique impedance values of $Z_{piezo}$ in each circuit 200 and as a result $V_R$ will likewise be unique for each copy of the circuit 200.

To test the above embodiment, $V_R$ was measured using a 12-bit analog-to-digital converter (ADC) built into a EK-TM4C123GXL model Tiva LaunchPad (DigiKey Electronics, Thief River Falls, Minn., USA). Inclusion of a microcontroller allowed automation of the majority of the response generation process. For consistent measurements, the ADC sampled the input voltage 10 times and determined a peak reading for those samples. This peak detection process was repeated 10,000 times, and the resultant values were averaged to determine an overall peak voltage value to offset background noise and increase reliability. In one embodiment, input AC voltage was 300 KHz.

Figure 3:
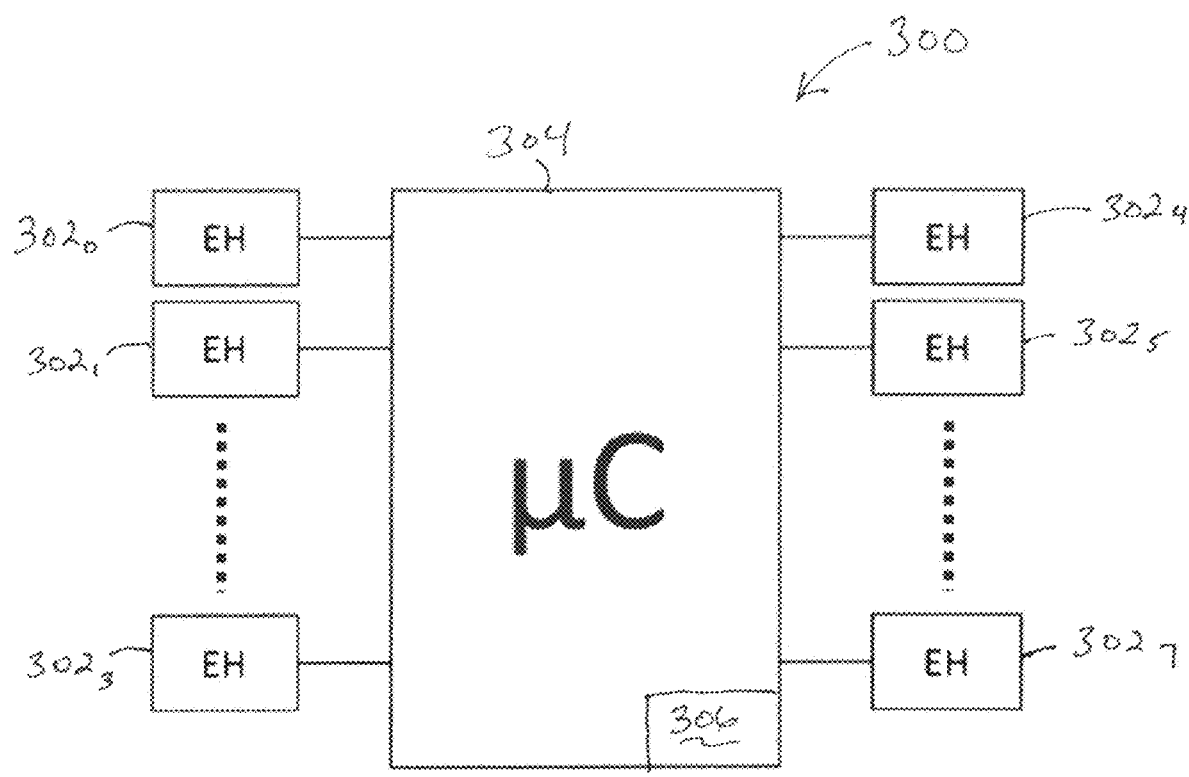
FIG. 3 is a reliability graph for the PUF equivalent circuit of FIG. 2.

The size of the 12-bit ADC potentially could limit how many bits long each response from the PUF could be without introducing some form of padding such as feeding the 12-bit ADC value into a hash function. This was accounted for by incorporating measurements taken from eight instances of the circuit 200 of FIG. 2. FIG. 3 illustrates an embodiment of a PUF 300 incorporating eight circuits $302_{0 \ldots 7}$ according to the present disclosure. The PUF includes a microcontroller 304 having a clock speed of 80 MHz, and an ADC 306 having a maximum sampling rate of 1 million samples per second. This required the ADC 306 to make a total of 100,000 samples per piezo sensor and 800,000 overall to generate a single response, thus reducing the amount of time required to generate a response and increasing the accuracy when calculating the peak voltage of the AC voltage input.

The system of FIG. 3 compares sum voltages for banks of three piezo sensors 206 and determines which is larger. The result of the comparison is denoted by a single bit. It was found that the uniqueness of the piezo sensors 206 due to manufacturing process variations resulted in unique voltage readings for each circuit. By utilizing summations of voltage readings for three different circuits 200, the number of possible unique comparison values was greatly increased. This effectively provided a comparison of intrinsic characteristics unique to each circuit. A total of 128 comparisons were made, generating a 128-bit response of the PUF 300.

Specifically, the PUF 300 calculates an average peak voltage associated with each piezo sensor 206 by selecting three values, summing them to provide a first summation, and comparing a summation of three different values. That comparison is represented by a single response value that is 1 if the first summation is larger or 0 if the first summation is smaller. This process is then repeated 127 times to generate a complete 128-bit response.

For this process, each comparison must be unique in terms of which groups of three are compared. Additionally, consideration must be given to which combinations of circuits 200 are summed and compared, to prevent bias in the result. For example, if the majority of comparisons contained a particular piezo sensor 206 and that sensor happened to provide the largest voltage value of the sensors of the PUF 300, the result would bias the response bits towards 1. Instead, the voltage values associated with each piezo sensor 206 of the described 8 circuit PUF 300 were used 48 times on each side of the comparison. This was determined by multiplying the number of comparisons (128) by the number of values summed on each side of the PUF 300 (3) before dividing by the total number of circuits 200/sensors 206 (8).

This could be done by a single algorithm generating 128 bits from balanced comparisons. However, it was found to be more efficient to use a shorter algorithm (algorithm 1) generating a subset of 8 bits that was still balanced. By invoking that shorter algorithm 16 times, a 128-bit response was invoked that was not biased towards any single reading. The steps of algorithm 1 are shown below.

Algorithm 1 PUF 8-bit Response Comparison Balancing

Algorithm

```
1:   procedure BALANCE(bits, place, v[ ], l[ ], r[ ])
2:     bits ← Array containing response bits
3:     place ← Current response bit to be generated
4:     v[ ] ← Array of each circuit's peak voltage
5:     l[ ] ← Array of 3 circuits to be summed
6:     r[ ] ← Array of 3 circuits to be summed
7:     for i = 0; i < 8; i = i + 1 do {
8:        lsum = v[(i + l[0]) mod 8]
               +v[(i + l[1]) mod 8]
               +v[(i + l[2]) mod 8]
9:        rsum = v[(i + r[0]) mod 8]
               +v[(i + r[1]) mod 8]
               +v[(i + r[2]) mod 8]
10:       if lsum > rsum then
11:          bits[place] = 1
12:       else
13:          bits[place] = 0
14:       place=place+1
15:    }
16:    return
```

The described algorithm 1 assumed that all 128 of the response bits were contained in an array bits. Algorithm 1 generated 8 response bits beginning at the location denoted by place. Array v contained the 8 peak voltage values associated with each piezo circuit 200 (each circuit 200 in the PUF 300 is designated by location, i.e. piezo 0 of circuit 0 is in location 0, piezo 1 is in location 1, and so on up to piezo 8 which is in location 8). Arrays l and r each denoted the three piezo sensors whose associated values were to be summed to make the first comparison. The generated response bit was 1 if the sum of the values associated with l was greater than the sum of values associated with r. Otherwise the response bit was 0. The value of place was incremented by 1 after each bit was generated to keep track of which bit of the overall 128-bit response would be generated next. The determination of which circuits 200 would be used in each subsequent comparison was done by incrementing each circuit 200 by 1 and then rolling back to 0 if the result would have been 8. The process completed after 8 total comparisons were made and as a result 8 response bits were generated. Algorithm 1 thus guaranteed that the value associated with each circuit 200 was used 3 times on each side of the comparison.

Because algorithm 1 required a series of 16 inputs to generate the 128-bit response, each input had to be chosen whereby invoking algorithm 1 did not inadvertently result in multiple instance of a same comparison. An algorithm 2 was provided showing a list of input values left and right for arrays l[ ] and r[ ], respectively, in algorithm 1 that were used to generate a 128-bit response without using the same comparison to generate multiple response bits. Algorithm 2 is shown below.

| Algorithm 2 Input Values to Balancing Algorithm | | |
|---|---|---|
| 1: | left: 0, 1, 2 | right: 3, 4, 5 |
| 2: | left: 0, 1, 3 | right: 2, 4, 5 |
| 3: | left: 0, 1, 4 | right: 2, 3, 5 |
| 4: | left: 0, 1, 5 | right: 2, 3, 4 |
| 5: | left: 0, 1, 6 | right: 2, 3, 4 |
| 6: | left: 0, 1, 7 | right: 2, 3, 4 |
| 7: | left: 0, 2, 3 | right: 1, 4, 5 |
| 8: | left: 0, 2, 4 | right: 1, 3, 5 |
| 9: | left: 0, 2, 5 | right: 1, 3, 4 |
| 10: | left: 0, 2, 6 | right: 1, 3, 4 |
| 11: | left: 0, 2, 7 | right: 1, 3, 4 |
| 12: | left: 0, 3, 4 | right: 1, 2, 5 |
| 13: | left: 0, 3, 5 | right: 1, 2, 6 |
| 14: | left: 0, 3, 6 | right: 1, 2, 7 |
| 15: | left: 0, 3, 7 | right: 1, 2, 4 |
| 16: | left: 0, 4, 5 | right: 1, 2, 3 |

By invoking algorithm 1 with the inputs shown in algorithm 2, a 128-bit response with improved uniformity due to lack of bias towards values from any single circuit 200 resulted. Values associated with each circuit 200 of the PUF were used an equal number of times in both summations on either side of the comparison (line 10 of algorithm 1). During generation of the 128-bit response, the peak voltage associated with each piezo sensor 206 was used a total of 96 times (48 times on each side of the comparison).

Three copies of the above-described PUF 300 were made and used to determine reliability and uniformity. Average reliability and average uniformity were evaluated individually for each PUF copy and overall as a whole for the PUF copies. Reliability of a PUF is a measure of how likely it is for a given input challenge to always produce a correct response. The ideal value is 100%, i.e. the PUF always produces a correct response. Reliability was calculated according to the following equation:

$$\text{Reliability} = 100\% - \frac{1}{k}\sum_{i=1}^{k}\frac{HD(R_i, R'_{i,t})}{n} \times 100\% \qquad (1)$$

wherein $HD(R_i, R'_{i,t})$ represents a hamming distance (HD) between a reference response $R_i$ and a response generated with different environmental conditions $R'_{i,t}$. The variable k represents the number of instances of the PUF 300, in this case 3.

Figure 4:
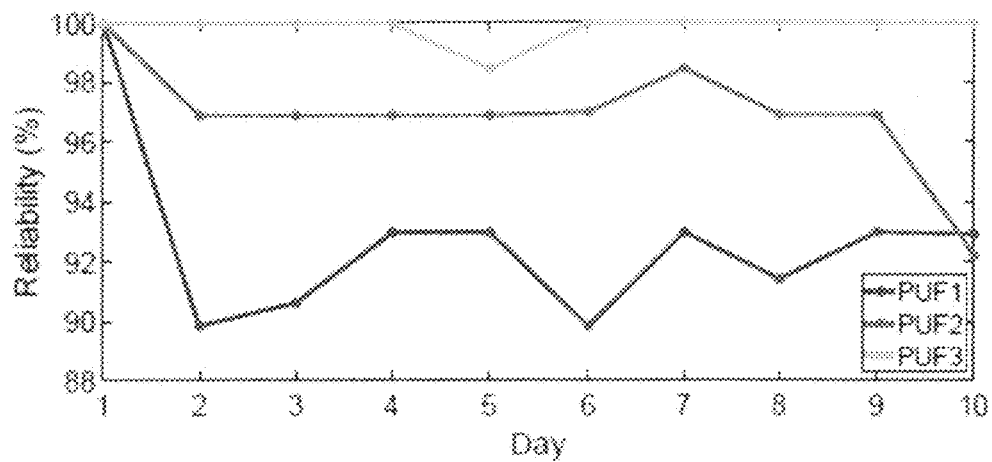
FIG. 4 illustrates a representative energy harvester-based PUF according to the present disclosure.

Reliability of the PUF 300 was evaluated by recording responses of each copy of the PUF over a period of 10 days. The Day 1 response was used as a reference response to which all subsequent responses were compared. FIG. 4 plots reliability values for each copy of the PUF 300 and shows that the worst reliability values for each PUF 300 respectively were 89.9%, 92.2%, and 98.4%. Table I shows average reliability for each individual PUF 300. Overall average reliability was 96.1%.

TABLE I

| AVERAGE RELIABILITY OF PROPOSED PUF | | | |
|---|---|---|---|
| PUF1 | PUF2 | PUF3 | Total |
| 91.84% | 96.53% | 99.83% | 96.07% |

Figure 5:
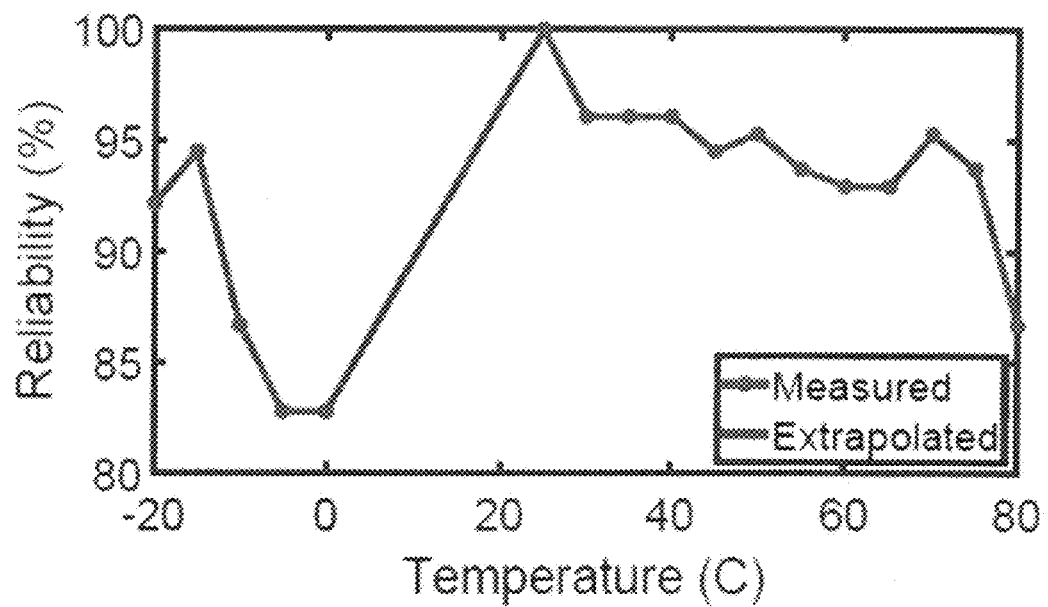
FIG. 5 is a temperature reliability graph for the PUF of FIG. 4.
Figure 6:
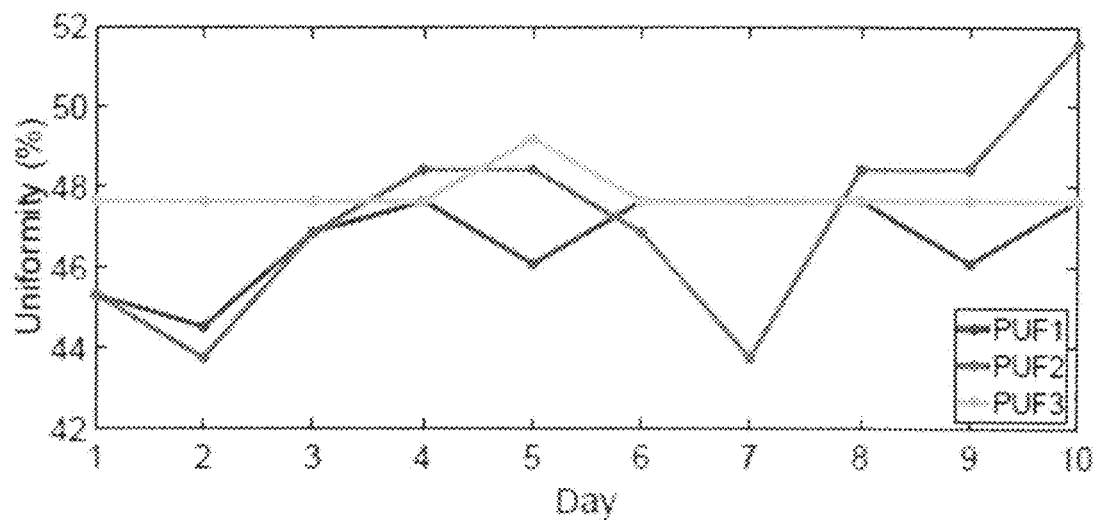
FIG. 6 is a uniformity graph for the PUF of FIG. 4.

Reliability of each individual PUF 300 was tested also across a range of temperatures from −20° C.-0° C. and from 25° C.-80° C. in 5° C. increments. Room temperature (25° C.) was chosen as a reference point. FIG. 5 plots the results of evaluation of reliability with respect to temperature and shows that reliability decreased but remained reasonably consistent as temperature deviated from 25° C.

Uniformity of a PUF 300 is a measure of how balanced the generated responses are. An ideal PUF provides an equal number of 1s and 0s in the response bits, and so an ideal uniformity value is 50%. Uniformity was calculated according to the following equation:

$$\text{Uniformity} = \frac{1}{n}\sum_{l=1}^{n} R_{i,l} \times 100\% \quad (2)$$

wherein $R_{i,l}$ was the l-th bit of an n-bit response generated by a PUF 300. Figure illustrates uniformity of each daily reading recorded for each copy of the PUF 300 and shows good consistency across time with each PUF reading remaining reasonably close to an ideal uniformity value of 50%.

Uniformity values of the responses from each PUF 300 copy were averaged to determine a general uniformity that could be expected. Average uniformity for each PUF 300 copy was determined by calculating and then averaging uniformity of each response from the 10-day period used in the reliability determinations summarized above. Table II shows average uniformity of each individual PUF 300 over the 10-day period. Average uniformity of the PUF 300 was 47.52%.

TABLE II

| AVERAGE RELIABILITY OF PROPOSED PUF | | | |
|---|---|---|---|
| PUF1 | PUF2 | PUF3 | Total |
| 46.72% | 47.19% | 47.81% | 47.24% |

Sensor-Based PUF

In embodiments of another aspect of the present disclosure, a sensor-based PUF architecture is described. The disclosed sensor-based PUF architecture comprises a microcontroller, a plurality of sensors capable of creating a resistance, and a voltage source. In embodiments, the PUF architecture comprises thermistor temperature sensors. However, it will be readily apparent to the skilled artisan that the described architecture readily lends itself to alternative sensors, for example humidity sensors, vibration sensors, noise sensors, light intensity sensors, heat sensors, and others. The skilled artisan will appreciate that the described architecture can incorporate any sensor that outputs a variable voltage, current, or resistance from which can be derived a voltage value associated with each component that can be measured. For example, certain sensors inherently provide unique resistance values directly associated with a voltage. Other devices inherently produce a unique output voltage (solar cells, for example) that can be directly measured.

In one possible embodiment, the PUF architecture comprises a microcontroller configured to supply a voltage input to eight thermistors arrayed in series. As is known, a thermistor is a temperature sensing device whose resistance changes with temperature. The design of the disclosed sensor-based PUF employs the principle that variations introduced during the manufacturing process cause individual thermistors to have different resistances at a given temperature. These variations are what allow providing a PUF capable of generating unique outputs.

Figure 7:
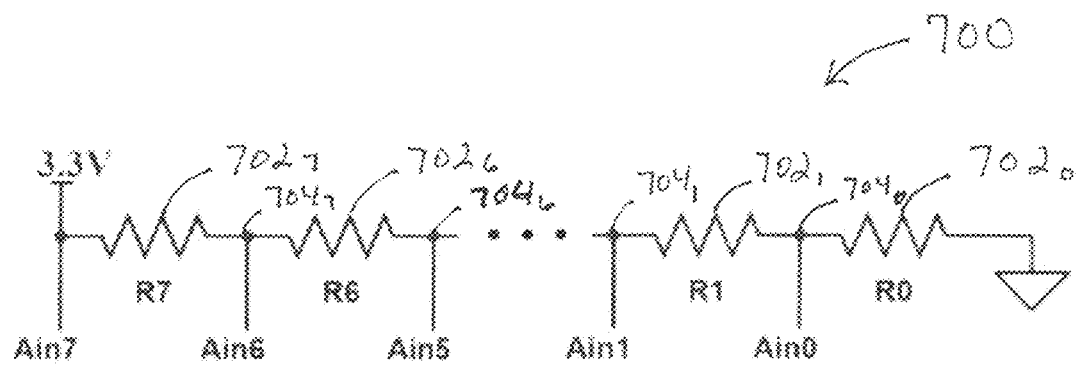
FIG. 7 illustrates a representative thermistor circuit according to the present disclosure.

The basic sensor-based PUF circuit 700 is shown in FIG. 7 and utilized NXP KTY81/220 thermistors and the microcontroller described supra. Operating parameters are shown below in Table III.

TABLE III

| Operating parameters of NXP KRY81/220 thermistors. | |
|---|---|
| Parameter | Value |
| Operating Temperature | −55° C. to 150° C. |
| Typical Resistance @ −20° C. | 1367 Ω |
| Typical Resistance @ 25° C. | 2000 Ω |
| Typical Resistance @ 80° C. | 2980 Ω |

The circuit 700 comprises eight thermistor temperature sensors $702_{0...7}$ (represented as resistors R) placed in series with a 3.3 V input voltage supplied by the microcontroller (not shown in this figure). A point before each thermistor $702_{0...7}$ is attached to an ADC input pin $704_{0...7}$ (Ain). The microcontroller is then able to take a voltage reading at each point and determine the voltage $V_R$ across each thermistor $702_{0...7}$ by finding the difference between two points surrounding each thermistor. For example, the voltage across thermistor $R_5$ would be equal to the difference in readings between ADC inputs $A_{in5}$ and $A_{in4}$. The following equations show all the calculations that are made to determine the voltage across each thermistor:

$$V_{R7} = A_{in7} - A_{in6}$$

$$V_{R6} = A_{in6} - A_{in5}$$

$$V_{R5} = A_{in5} - A_{in4}$$

$$V_{R4} = A_{in4} - A_{in3}$$

$$V_{R3} = A_{in3} - A_{in2}$$

$$V_{R2} = A_{in2} - A_{in1}$$

$$V_{R1} = A_{in1} - A_{in0}$$

$$V_{R0} = A_{in0} \quad (1)$$

To account for noise and inter-reading variation of single readings, the final value for each ADC reading was presented as the average result of 100,000 readings.

Figure 8:
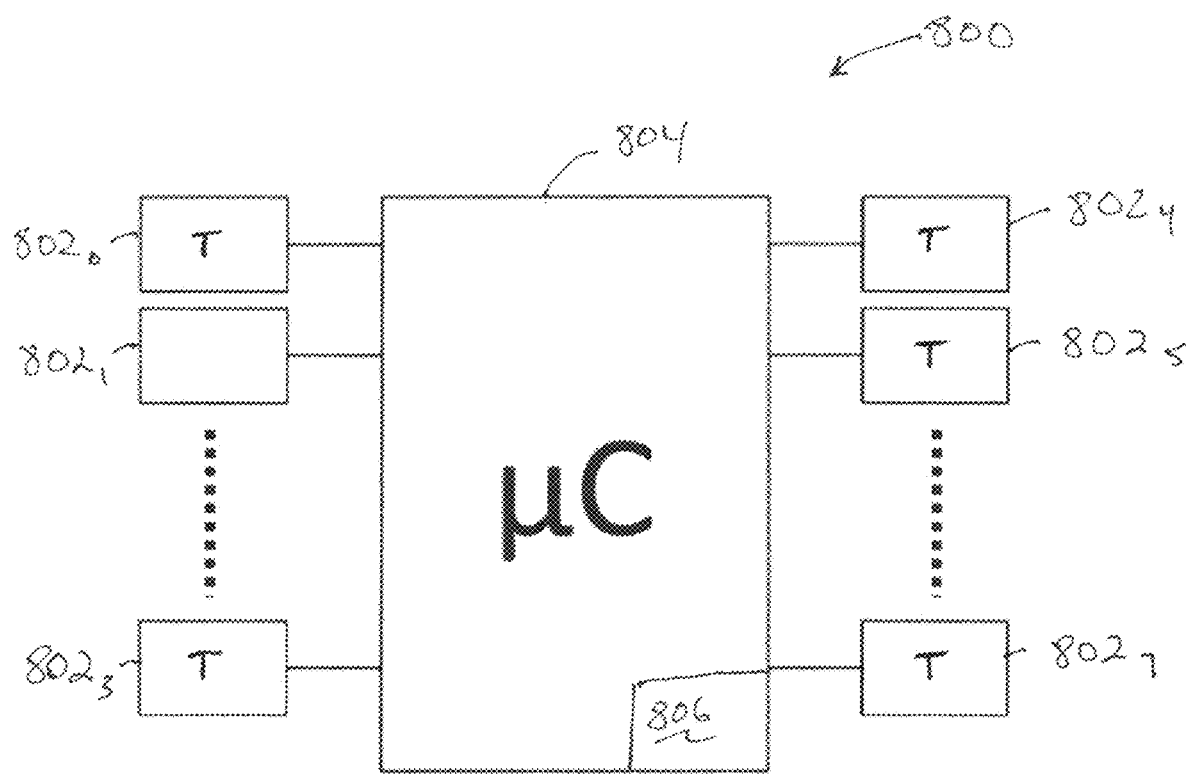
FIG. 8 illustrates a sensor-based PUF equivalent circuit according to the present disclosure.

The complete PUF architecture 800 for the sensor-based PUF is substantially as shown in FIG. 3 except for the inclusion of thermistors 802 rather than energy harvesters. See FIG. 8. The design comprises 8 thermistor temperature sensors $802_{0...7}$. Each sensor is connected to a microcontroller 804 in the configuration shown in FIG. 8. The onboard ADC of microcontroller 804 is used to sample the voltage readings at each point in the circuit and uses that data to ultimately derive a voltage drop across each thermistor $802_{0 \ldots 7}$. After this step is completed, the individual voltage data is processed and a 128-bit response constructed using the algorithms described supra. As described, the algorithms generate a response from the PUF by making a series of comparisons between total output readings for predetermined groups of a given component, in this case thermistor sensors $802_{0 \ldots 7}$. The algorithm assumes that each thermistor sensor $802_{0 \ldots 7}$ should have the same reading, and any differences are solely due to their intrinsic variations. This means that actions such as applying heat to some of the thermistor sensors $802_{0 \ldots 7}$ will result in unreliable readings. The end result is a PUF 800 design that is directly based on thermistor temperature sensors $802_{0 \ldots 7}$.

Figure 9:
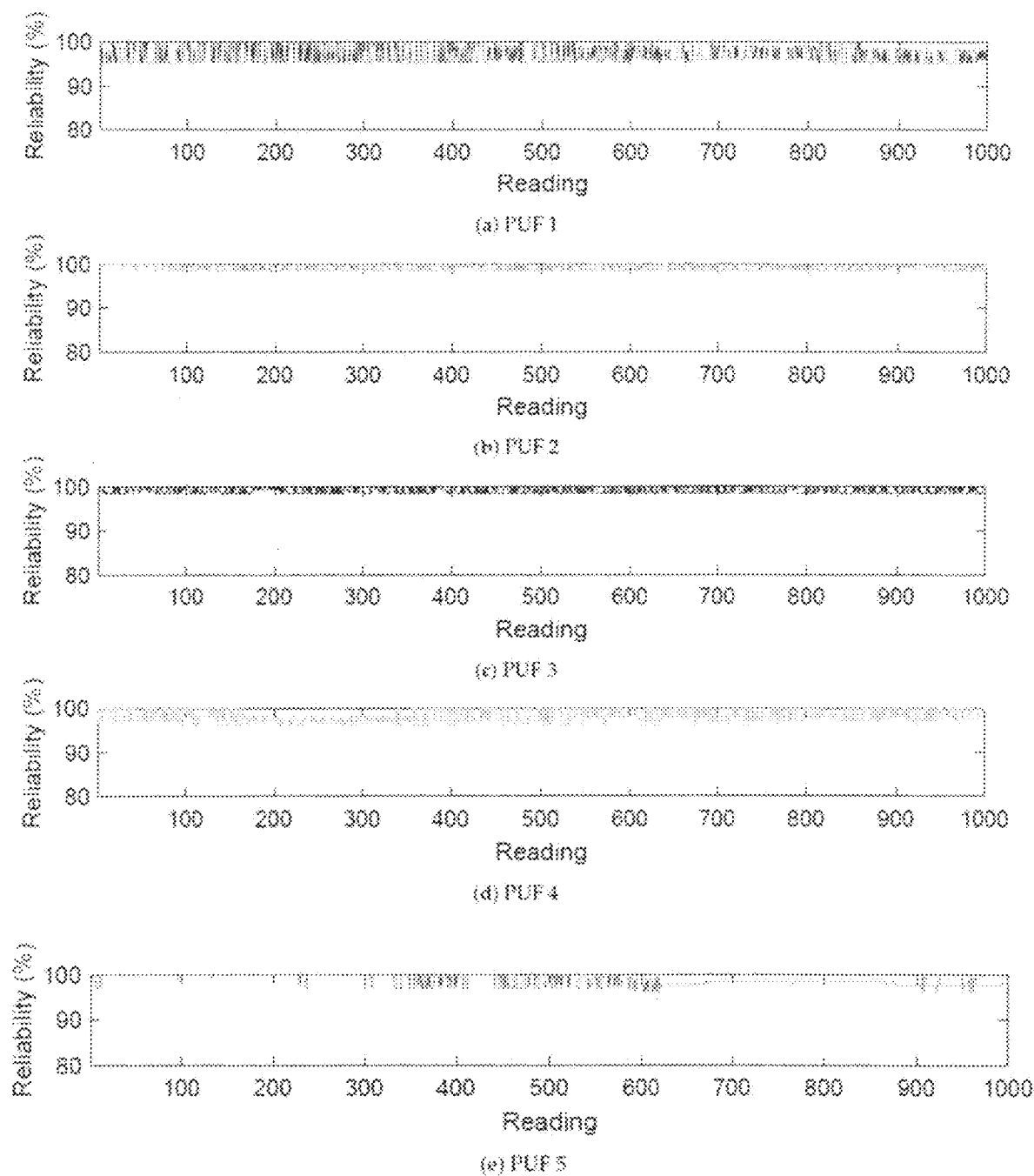
FIG. 9 shows reliability graphs for five copies of the PUF equivalent circuit of FIG. 8.

The responses generated from the described sensor-based PUF 800 were tested to evaluate their reliability as described supra. In addition, the uniqueness of the design was evaluated by performing Monte Carlo simulations with 1000 simulated copies of the PUF 800. For initial reliability testing 1000 consecutive readings were taken from 5 copies of the sensor-based PUF 800. The first response generated by each PUF 800 was used as the reference response. All readings were taken in a lab space under normal room conditions. FIG. 9 shows the graphs for the reliability values of the responses generated by each PUF. The graphs show that each PUF copy maintained a level of reliability close to the ideal value of 100%. Table IV contains the average reliability values for each copy of the PUF. Among the five copies of the proposed PUF, PUF2 had the highest average reliability at 99.16% while PUF1 had the lowest at 97.09%. The overall combined average reliability for the tested copies was 98.46%.

TABLE IV

Average reliability values of a sensor-based PUF architecture over 1000 responses.

| PUF1 | PUF2 | PUF3 | PUF4 | PUF5 | Total |
| --- | --- | --- | --- | --- | --- |
| 97.09% | 99.16% | 99.09% | 98.08% | 98.91% | 98.46% |

Figure 10:
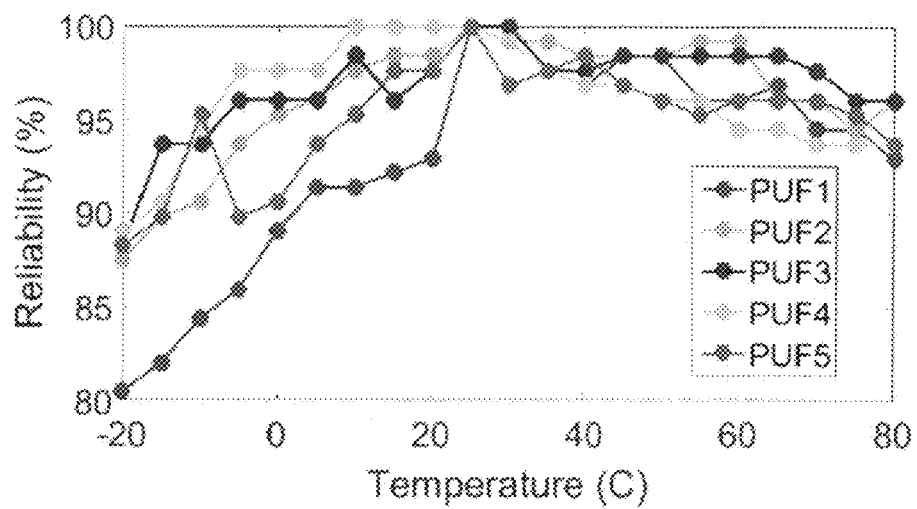
FIG. 10 is a temperature reliability graph for the PUF of FIG. 8.

Reliability testing was also performed on each PUF 800 copy over a temperature range of −20° C. to 80° C. in 5° C. increments. The results are shown in FIG. 10. 25° C. was used as the reference temperature for determining the reliability values, and so each copy of the PUF 800 shows 100% reliability at 25° C. The graph shows that the reliability values begin to fall off as the temperature moves away from the reference temperature of 25° C. Table V shows the average temperature reliability for each copy of the PUF 800. The overall total average reliability for the set was 95.49%.

TABLE V

Average reliability from −20° C. to 80° C.

| PUF1 | PUF2 | PUF3 | PUF4 | PUF5 | Total |
| --- | --- | --- | --- | --- | --- |
| 92.97% | 96.32% | 96.84% | 96.21% | 95.09% | 95.49% |

Figure 11:
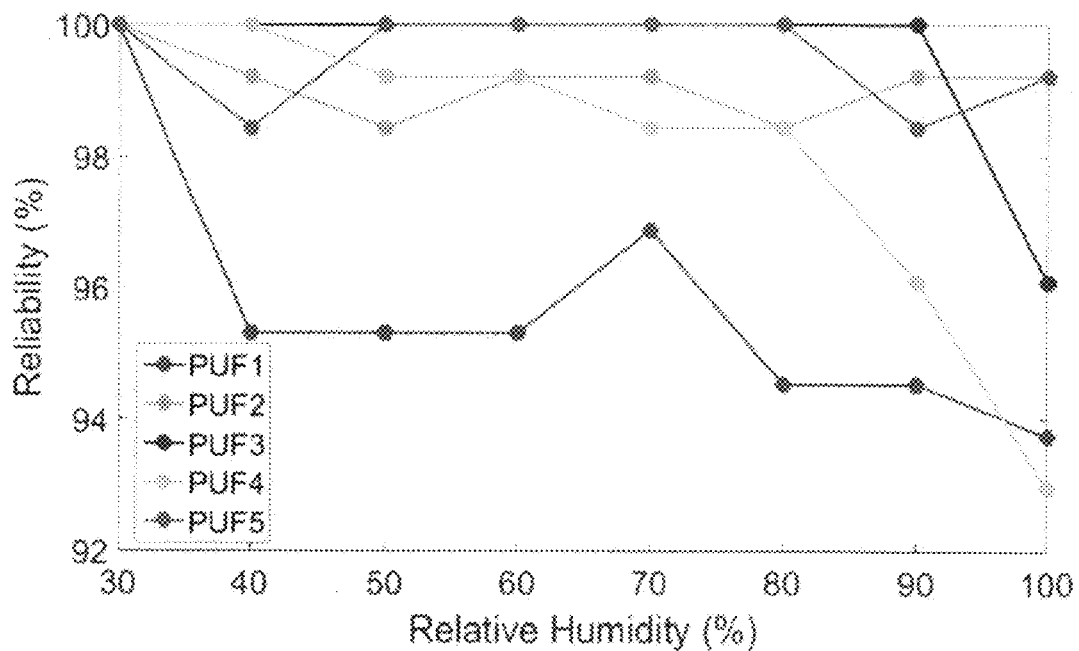
FIG. 11 is a humidity reliability graph for the PUF of FIG. 8.

Reliability testing was also performed with respect to relative humidity. 30% relative humidity was used as the reference value and the relative humidity increased from 30% to 100% in increments of 10%. FIG. 11 shows the reliability of the PUFs as the relative humidity increases from 30%. Overall, the PUFs 800 seemed to be resistant to changes in relative humidity. Most copies did not show consistent drops in reliability until the relative humidity reached 80%. Table VI shows the average reliability for each copy of the PUF 800. PUF1 once again demonstrated the lowest reliability of the test group with an average reliability of 95.70%. The overall total average reliability was 98.30%.

TABLE VI

Average Reliability from 30% to 100% Relative Humidity.

| PUF1 | PUF2 | PUF3 | PUF4 | PUF5 | Total |
| --- | --- | --- | --- | --- | --- |
| 95.70% | 99.12% | 99.12% | 98.5% | 99.51% | 98.30% |

The responses generated from the described sensor-based PUF 800 were tested to evaluate their uniformity as described supra. Table VII shows the average uniformity value for each copy of the PUF 800 across each of the areas of testing (1000 consecutive responses, temperature, and humidity). The overall average uniformity values for the different tests were 50.22%, 49.34%, and 47.91%, respectively. On average, the uniformity values were very close to the ideal value of 50%.

TABLE VII

Average uniformity values of sensor-based PUFs.

| | PUP1 | PUF2 | PUF3 | PUF4 | PUF5 | Total |
| --- | --- | --- | --- | --- | --- | --- |
| Consecutive | 49.66% | 49.96% | 50.05% | 49.48% | 51.94% | 50.22% |
| Temperature | 48.59% | 48.21% | 49.52% | 48.92% | 51.45% | 49.34% |
| Humidity | 47.46% | 46.58% | 49.51% | 47.85% | 48.14% | 47.91% |

The sensor-based PUFs 800 were also evaluated for uniqueness. The uniqueness of a PUF represents the ability to distinguish one particular instance of a PUF from a group of PUFs of the same type. The ideal uniqueness value is 50%. The following equation is used to calculate uniqueness:

$$\text{Uniqueness} = \frac{2}{k(k-1)} \sum_{i=1}^{k-1} \sum_{j=i+1}^{k} \frac{HD(R_i, R_j)}{n} \times 100\% \quad (4)$$

This equation determines the average hamming distance (HD) among k total PUFs 800. $R_i$ and $R_j$ represent m-bit responses produced by PUFs i and j, respectively where $i \neq j$. The common method for evaluating the uniqueness property of a PUF is by performing Monte Carlo simulations as this allows many unique copies to be generated. For the simulations 1000 simulated copies of the PUF 800 were created. A normal distribution of resistors was created using the manufacturer specified resistances at 25° C.: minimum of 1960Ω, maximum of 2040Ω, and typical of 2000Ω. Each simulated instance was created by randomly choosing 8 resistors from the distribution. The uniqueness was determined to be 49.89%.

Advantageously, the PUFs described herein incorporating the described architecture can be constructed from existing components, thus easing manufacturing constraints associated with PUFs that rely on transistor level variations that occur during manufacturing. Moreover, the components used in the disclosed PUFs already are often in common use in many IoT devices and thus can be readily incorporated into IoT applications such as security-related applications without need of altering manufacturing parameters of the applications, adding additional components compared to OEM devices, etc.

The foregoing description of a preferred embodiment has been presented for purposes of illustration and description. It is not intended to be exhaustive or to limit the invention to the precise form disclosed. Obvious modifications or variations are possible in light of the above teachings. For example, alternative energy sources such as kinetic, solar radiation, thermal energy, and others could be targeted by suitable devices incorporated into the PUF architecture according to the present disclosure.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the foregoing description and appended claims when interpreted in accordance with the breadth to which they are fairly, legally and equitably entitled.

What is claimed:

1. An equivalent circuit architecture for generating a physically unclonable function (PUF) response comprising:
    a plurality of devices capable of generating an output that is or can be converted to a voltage output;
    a voltage source adapted to apply a voltage to each device of the plurality of devices; and
    a microcontroller adapted to receive the voltage output from each device of the plurality of devices;
    wherein the microcontroller is configured to at least:
        determine an average peak voltage for a first predefined group of the plurality of devices to provide a first summation value;
        determine an average peak voltage for a different predefined group of the plurality of devices to provide a different summation value; and
        compare the first summation value to the different summation value and output a first response value that is defined as 1 if the first summation value is greater than the different summation value or is defined as 0 of the first summation value is less than the different summation value, whereby the first response value defines a first PUF response bit.

2. The equivalent circuit architecture of claim 1, wherein the microcontroller is further configured to:
    determine an average peak voltage for a next predefined group of the plurality of devices that is different from the first predefined group and the different predefined group to provide a next summation value;
    determine an average peak voltage for a next different predefined group of the plurality of devices that is different from the first predefined group, the different predefined group, and the next predefined group to provide a next different summation value; and
    compare the next summation value to the next different summation value and output a next response value that is defined as 1 if the next summation value is greater than the next different summation value or is defined as 0 if the next summation value is less than the next different summation value, whereby the next response value defines a next PUF response bit.

3. The equivalent circuit architecture of claim 2, wherein the microcontroller is further configured to iteratively repeat the steps of determining, comparing, and outputting until a 128-bit PUF response value is defined.

4. The equivalent circuit architecture of claim 3, wherein the microcontroller is further configured to determine a peak voltage of each device of the plurality of devices an equal number of times to generate the 128-bit PUF response value.

5. The equivalent circuit architecture of claim 1, wherein the voltage source is an alternating current (AC) source.

6. The equivalent circuit architecture of claim 5, wherein the plurality of devices are energy harvesting devices.

7. The equivalent circuit architecture of claim 6, further comprising a plurality of resistors that is equivalent in number to the plurality of devices.

8. The equivalent circuit architecture of claim 7, comprising eight energy harvesting devices.

9. The equivalent circuit architecture of claim 6, wherein the energy harvesting devices are piezo sensors.

10. The equivalent circuit architecture of claim 1, wherein the voltage source is a direct current (DC) source.

11. The equivalent circuit architecture of claim 10, wherein the plurality of devices are thermistors.

12. The equivalent circuit architecture of claim 11, comprising eight thermistors.

13. In an equivalent circuit architecture for implementing a physically unclonable function (PUF), a computer-implemented method for generating a unique PUF response to a challenge, comprising:
    providing a PUF architecture comprising a plurality of devices each capable of generating an output that is or can be converted to a voltage output, a voltage source, and a microcontroller adapted to receive the voltage output from each device of the plurality of devices, the microcontroller further comprising computer-executable instructions to at least:
        determine an average peak voltage for a first predefined group of the plurality of devices to provide a first summation value;
        determine an average peak voltage for a different predefined group of the plurality of devices to provide a different summation value; and
        compare the first summation value to the different summation value and output a first response value that is defined as 1 if the first summation value is greater than the different summation value or is defined as 0 of the first summation value is less than the different summation value, whereby the first response value defines a first PUF response bit.

14. The method of claim 13, wherein the microcontroller is further configured to:
    determine an average peak voltage for a next predefined group of the plurality of devices that is different from the first predefined group and the different predefined group to provide a next summation value;
    determine an average peak voltage for a next different predefined group of the plurality of devices that is different from the first predefined group, the different predefined group, and the next predefined group to provide a next different summation value; and
    compare the next summation value to the next different summation value and output a next response value that is defined as 1 if the next summation value is greater than the next different summation value or is defined as 0 if the next summation value is less than the next different summation value, whereby the next response value defines a next PUF response bit.

15. The method of claim 14, wherein the microcontroller is further configured to iteratively repeat the steps of determining, comparing, and outputting until a 128-bit PUF response value is defined.

16. The method of claim 15, wherein the microcontroller is further configured to determine a peak voltage of each device of the plurality of devices an equal number of times to generate the 128-bit PUF response value.

17. The method of claim 14, wherein the next predefined group and the next different predefined group each consist of three devices.

18. The method of claim 13, wherein the first predefined group and the different predefined group each consist of three devices.

19. The method of claim 13, including providing an alternating current (AC) source as the voltage source.

20. The method of claim 19, including providing a plurality of energy harvesting devices as the plurality of devices capable of generating a voltage output.

21. The method of claim 20, including providing an equivalent number of energy harvesting devices and resistors.

22. The method of claim 21, including providing eight energy harvesting devices.

23. The method of claim 20, wherein the energy harvesting devices are piezo sensors.

24. The method of claim 13, including providing a direct current (DC) voltage source as the voltage source.

25. The method of claim 24, including providing a plurality of thermistors as the plurality of devices capable of generating a voltage output.

26. The method of claim 25, including providing eight thermistors.

* * * * *